(12) United States Patent
Catrinta

(10) Patent No.: US 8,646,586 B2
(45) Date of Patent: Feb. 11, 2014

(54) TORQUE-LIMITING CLUTCH BRAKE

(76) Inventor: John Catrinta, Chicago, IL (US)

( * ) Notice: Subject to any disclaimer, the term of this patent is extended or adjusted under 35 U.S.C. 154(b) by 142 days.

(21) Appl. No.: 13/150,368

(22) Filed: Jun. 1, 2011

(65) Prior Publication Data

US 2011/0303504 A1    Dec. 15, 2011

Related U.S. Application Data

(60) Provisional application No. 61/354,852, filed on Jun. 15, 2010.

(51) Int. Cl.
*F16D 67/02* (2006.01)

(52) U.S. Cl.
USPC ............... 192/13 R; 192/DIG. 1; 192/109 A; 188/218 XL

(58) Field of Classification Search
None
See application file for complete search history.

(56) References Cited

U.S. PATENT DOCUMENTS

| | | |
|---|---|---|
| 540,558 A | 6/1895 | Peregrine |
| 553,525 A | 1/1896 | Hankin |
| 555,512 A | 3/1896 | Johnson |
| 714,605 A | 11/1902 | Potter |
| 744,917 A | 11/1903 | Houldsworth |
| 1,453,673 A | 5/1923 | Hebert |
| 1,855,899 A | 4/1932 | Barclay |
| 2,117,728 A | 5/1938 | Katcher |
| 2,264,192 A | 11/1941 | Wellman |
| 2,637,987 A | 5/1953 | Hill |
| 3,016,119 A | 1/1962 | Rosenberger |
| 3,626,540 A | 12/1971 | Rood |
| 3,745,790 A | 7/1973 | Ryan |
| 3,763,977 A | 10/1973 | Sink |
| 4,043,437 A | 8/1977 | Taylor |
| 4,046,237 A | 9/1977 | Root |
| 4,186,826 A | 2/1980 | MacKendrick |
| 4,512,450 A * | 4/1985 | Babcock ..................... 192/12 R |
| 4,657,124 A | 4/1987 | Flotow |
| 4,762,215 A | 8/1988 | Flotow |
| 4,782,926 A | 11/1988 | Kitano |
| 4,807,730 A | 2/1989 | Kitano |
| 4,832,165 A * | 5/1989 | Nishimura et al. ......... 192/13 R |
| 4,947,969 A | 8/1990 | Tarlton, Sr. |
| 5,000,721 A | 3/1991 | Williams |

(Continued)

FOREIGN PATENT DOCUMENTS

| | | |
|---|---|---|
| DE | 102005056282 A1 | 5/2007 |
| EP | 1918607 A1 | 5/2008 |
| WO | 9510428 A1 | 4/1995 |
| WO | 03002885 A1 | 1/2003 |

OTHER PUBLICATIONS

International Search Report and Written Opinion for PCT/US2011/039013, mailed Mar. 4, 2013.

*Primary Examiner* — David D Le
*Assistant Examiner* — Mark Manley
(74) *Attorney, Agent, or Firm* — Cook Alex Ltd.

(57) ABSTRACT

A clutch brake is provided for mounting on a rotatable shaft comprising an outer annular housing and an inner annular collar. The inner collar is mounted within the housing and is secured to the rotatable shaft so as to be rotatable with the shaft and capable of rotation relative to the housing. One or more pads are interposed between the housing and the collar and is biased to provide frictional engagement between the two. Preferably both the outer housing and collar comprise a pair of arcuate semi-annular members to facilitate installation and removal.

10 Claims, 7 Drawing Sheets

(56) References Cited

U.S. PATENT DOCUMENTS

| | | | |
|---|---|---|---|
| 5,031,739 A | 7/1991 | Flotow | |
| 5,076,406 A | 12/1991 | Gregory | |
| 5,099,970 A | 3/1992 | Harris | |
| 5,285,881 A | 2/1994 | Lero | |
| 5,325,949 A | 7/1994 | Dommett | |
| 5,415,256 A | 5/1995 | Weigand | |
| 5,435,425 A | 7/1995 | Ijames | |
| 5,452,780 A | 9/1995 | Gabilondo | |
| 5,456,344 A | 10/1995 | Nellums | |
| 5,833,567 A * | 11/1998 | Fernandez | 475/255 |
| 5,864,935 A | 2/1999 | Baumgartner | |
| 5,873,444 A | 2/1999 | Kozhevnikov | |
| 5,957,256 A | 9/1999 | Allen, Jr. | |
| 5,967,274 A | 10/1999 | Leone | |
| 6,589,121 B1 | 7/2003 | Leonard | |
| 6,725,994 B2 | 4/2004 | Bacon | |
| 6,827,193 B2 | 12/2004 | Conrad | |
| 7,311,183 B2 | 12/2007 | Black, Jr. | |
| 8,096,394 B2 * | 1/2012 | Settles et al. | 192/13 R |
| 2002/0117362 A1 | 8/2002 | Catrinta | |
| 2002/0148695 A1 | 10/2002 | Latsko | |
| 2002/0157913 A1 | 10/2002 | Shimizu | |
| 2003/0062234 A1 | 4/2003 | Aker | |
| 2004/0035665 A1 | 2/2004 | Mochizuki | |
| 2004/0144609 A1 | 7/2004 | Schneider | |
| 2005/0082137 A1 | 4/2005 | Chang | |
| 2005/0109573 A1 | 5/2005 | Omata | |
| 2005/0133337 A1 * | 6/2005 | AbuSamra et al. | 192/105 CP |
| 2005/0155832 A1 | 7/2005 | Hornbrook | |
| 2006/0049275 A1 * | 3/2006 | Santiago et al. | 239/240 |
| 2008/0099303 A1 | 5/2008 | Tekesky | |
| 2008/0308381 A1 | 12/2008 | Tekesky | |

* cited by examiner

TORQUE-LIMITING CLUTCH BRAKE

CROSS REFERENCE TO RELATED APPLICATION

This application claims the benefit of the filing date of U.S. Provisional Appln. Ser. No. 61/354,852 filed Jun. 15, 2010, the entire contents of which is incorporated by reference herein.

BACKGROUND

This invention relates to friction clutches and transmissions for large automotive vehicles.

A clutch brake has generally a flat and annular shape, and is splined onto the transmission input shaft in between the release bearing mechanism and the transmission. Upon disengagement of the main clutch of the vehicle, the clutch brake retards and stops the rotation of the driven shaft so that a smooth gear shifting operation may be performed. Because of its relatively small size and torsional forces to which it is subjected during use, replacement of the clutch brake is often required prior to the replacement of the main clutch transmission.

A number of clutch brake designs are in use, and each of the known designs has some disadvantages, mostly related to the assembly, installation and/or removal of the clutch brake. These known designs may be categorized according to their installation procedure, and are available in three versions: (1) a unitary annular assembly, (2) an assembly with two separate mating halves, and (3) a hinged assembly.

The unitary assembly, although inexpensive, is replaced by partially disassembling the clutch, lowering the transmission, or by fracturing the clutch brake in two places to allow its removal. All three replacement options are costly, the last one also being potentially dangerous.

Clutch brakes that comprise mating halves assembled and secured to form an annular assembly are exemplified by the clutch brakes shown in U.S. Pat. No. 4,512,450 to Babcock, U.S. Pat. No. 5,031,739 to Flotow et al., U.S. Pat. No. 5,076,406 to Gregory et al., and U.S. Pat. No. 5,435,425 to Ijames. These clutch brakes have their two halves connected through various methods and fasteners.

The subsequent evolution of the clutch brake resulted in hinged-type brakes, which have been well received by the market. Such brakes are shown in U.S. Pat. No. 5,285,881 to Lero et al., U.S. Pat. No. 6,450,310 to Catrinta (the inventor of the clutch brake disclosed herein), and in U.S. Pat. No. 7,311,183 to Black, Jr. et al. These patents disclose clutch brakes comprised of two arcuate members pivotally connected to each other at one end and connected by other means at the second end to form a closed annular assembly about the shaft. The hinged-type clutch brakes offer an easier installation and removal as compared with the two-piece clutch brakes.

Some clutch brakes include a torque-limiting feature. Torque-limiting designs reduce the frequency of replacement necessary by improving the clutch brake longevity and provide a higher safety factor for the transmission and the clutch. This is accomplished by permitting the clutch brake to slip when excessive braking pressure is applied to the brake, thereby avoiding the excessive stress which contributes to wear and tear. A number of patents (U.S. Pat. No. 3,763,977 to Sink, U.S. Pat. No. 4,043,437 to Taylor, U.S. Pat. No. 4,046,237 to Taylor, U.S. Pat. No. 4,186,826 to MacKendrick et al., U.S. Pat. No. 4,657,124 to Flotow, U.S. Pat. No. 4,762,215 to Flotow et al., U.S. Pat. No. 4,782,926 to Kitano et al., and U.S. Pat. No. 4,807,730 to Kitano et al., and U.S. Pat. No. 4,947,969 to Tarlton) teach the use of a particular friction coupling between an outer housing and inner collar member. When the torsional force between the housing and collar is too great, they slip relative to each other and thereby avoid damage. Also, unlike traditional designs, a torque-limiting clutch brake will not disrupt vehicle operation when improperly applied.

While torque-limiting designs work relatively well for their intended purpose, the clutch brake will still eventually fail and must be replaced. Thus, for known torque-limiting clutch brake designs, the clutch brake must be replaced by lowering and disassembling the clutch and transmission.

The splittable sections concept to facilitate installation and replacement was first addressed relative to torque-limiting clutch brakes in U.S. Pat. No. 5,099,970 to Harris, followed by U.S. Pat. No. 5,415,256 to Weigand et al. Harris discloses a splittable torque-limiting clutch brake which utilizes a detent mechanism as the torque limiting feature, instead of a friction type mechanism. Use of the detent mechanism facilitates making the device in splitable halves which can be installed without removing the clutch and transmission from the vehicle. Weigand et al. provide a multi-piece friction type torque-limiting clutch brake which is also splittable into halves for easy removal and installation.

Although the concept disclosed in these two patents combines the ease of replacement with the torque-limiting feature, there are drawbacks to the designs. Specifically, the relative complexity and fragility of most of the components of these clutch brakes render them unsuitable for the harsh environment in which they must operate.

Accordingly, it is an object of the present invention to provide a torque-limiting clutch brake assembly that is easily installed on and removed from the transmission input shaft without damage to the clutch brake.

It is a further object of the present invention to provide a torque-limiting clutch brake that may be installed or removed without use of special tools and, more specifically, may be installed or removed manually.

BRIEF SUMMARY OF THE INVENTION

These objects, as well as others that will become apparent upon reference to the accompanying drawings and following detailed description, are provided by a clutch brake which has a frictional torque-limiting mechanism and which splits into sections for convenient removal and installation.

In one embodiment of the present invention, the clutch brake comprises an inner annular collar member adapted to fit around and engage a transmission gearbox input shaft so as to be rotatable therewith. An outer housing is provided that includes two semicircular sections, such that a limited amount of rotational torque is transmitted between the collar and the outer housing before relative movement between the outer housing and the inner collar is permitted.

More specifically, a friction type torque-limiting mechanism is formed of an inner annular member preferably having two generally semicircular flat half-rings that preferably have complimentary shaped ends to keep them engaged. The semicircular rings comprise or support pads that are biased into frictional engagement with the outer housing. In a first embodiment, the half-rings of the inner annular member are formed with pockets or recesses for receiving the pads, with spring washers arranged in such way to exert pressure on the pads located in the pockets to force them into engagement with the outer housing. In a second embodiment, the pad comprises an expandable toroidal-shaped semicircular member concentric with the half-rings of the outer housing, with the expandable member being biased into engagement with the outer housing. In a third embodiment, the half rings of the inner annular member are formed with pockets or recesses for receiving the pads, and the pads comprise leaf springs that frictionally engage the outer housing.

Both outer housing arcuate members comprise semicircular covers on both sides which overlie the pads, and against which the pads apply an outward force. When torque on the clutch brake exceeds a certain level, friction between the pads and the outer housing is overcome, and the clutch brake housing slips relative to the inner collar, thereby limiting the forces placed on, and preventing damage to, the clutch brake.

In another aspect of the invention, the outer housing may be formed by two semicircular or arcuate members that together form annular flat ring. The arcuate members are preferably joined together at one end by a fastener to provide a pivoting end so that the two halves of the housing can be easily placed around the input shaft with one hand through a relatively small opening and then swung together around the shaft. The second ends of each arcuate member of the housing includes a complementarily-shaped mating projections to releasably join the second ends of the arcuate members to each other, thus removably securing the clutch brake to the input shaft. When the arcuate members are closed, an audible noise is created to indicate to the installer that a fastener can be installed to complete the closing of the brake and securing it to the shaft.

These aspects, as well as others, will become apparent upon references to the attached drawings and following detailed description.

In another aspect of the invention, the second ends of each arcuate member of the housing may include an aperture for receiving a rod. When a rod is received in each of the holes, levers are created which may be gripped by the installer to facilitate the closing of the clutch brake around the input shaft.

These aspects, as well as others, will become apparent upon reference to the attached drawings and following detailed description.

BRIEF DESCRIPTION OF THE DRAWINGS

FIG. 5a is an enlarged cross sectional view taken along line 5a of FIG. 4a.

DESCRIPTION OF THE PREFERRED EMBODIMENT

Exemplary embodiments of a clutch brake according to the present invention are described below. As will be apparent to those of ordinary skill in the art, this particular embodiment may be reconfigured without departing from the scope and spirit of the invention, and optional features may be included that one of ordinary skill would recognize as not being required to fall within the scope of the invention.

Figure 1:
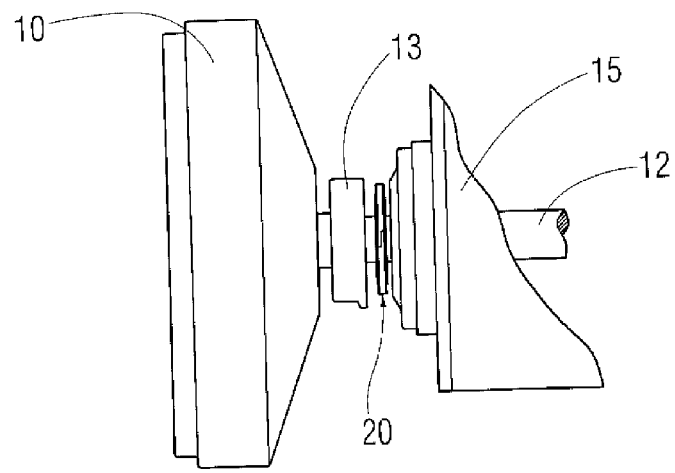
FIG. 1 is a plan view illustrating a clutch and transmission of an automotive vehicle including a clutch brake.

Turning to the figures of the drawings, there is seen in FIG. 1 a clutch brake assembly, generally indicated by 20, which is both torque-limiting and conventionally replaceable. As shown in FIG. 1, the clutch brake 20 is secured to gearbox input shaft 12 between the transmission 15 and the clutch 10/release bearing 13. The clutch brake assembly 20 can be described generally as having two splittable halves, indicated as 20a and 20b in FIG. 2. As best seen in FIGS. 3a, 3b and 3c, the clutch brake is made up of plurality of generally semicircular or arcuate members that combine to form an annular, ring-shaped member. This sectional design allows the brake to split into halves for convenient removal and replacement.

Figure 2:
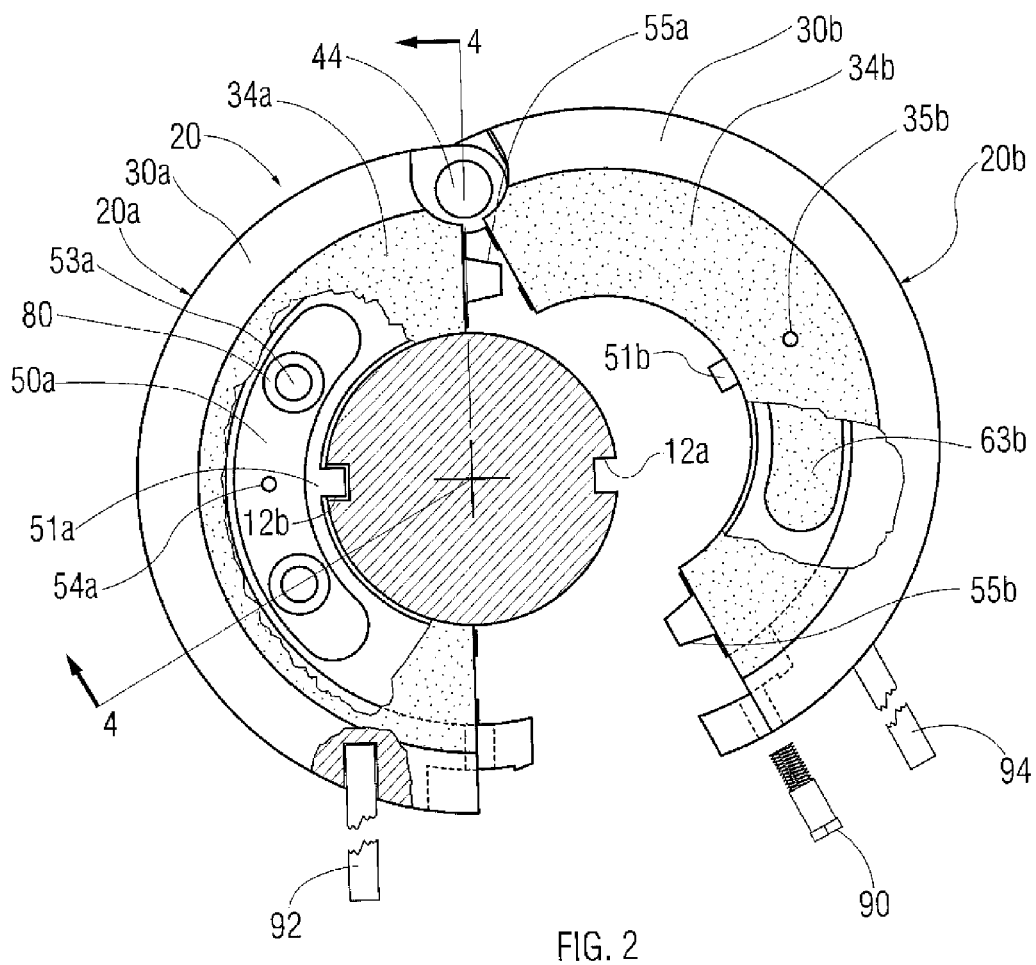
FIG. 2 is a plan view of a first embodiment of a clutch brake according to the present invention shown in an open position, with the associated transmission input shaft shown in cross-section.
Figure 3A:
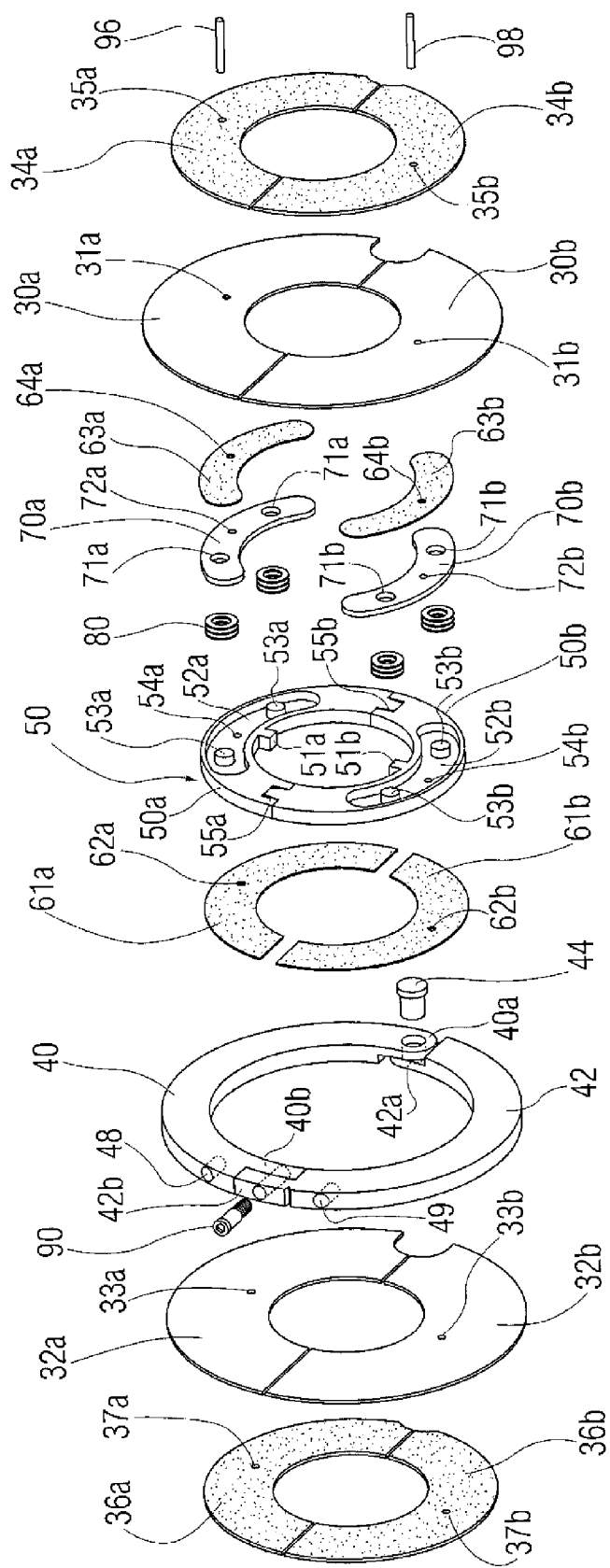
FIG. 3a is an exploded perspective view of the clutch brake assembly of FIG. 2.
Figure 3B:
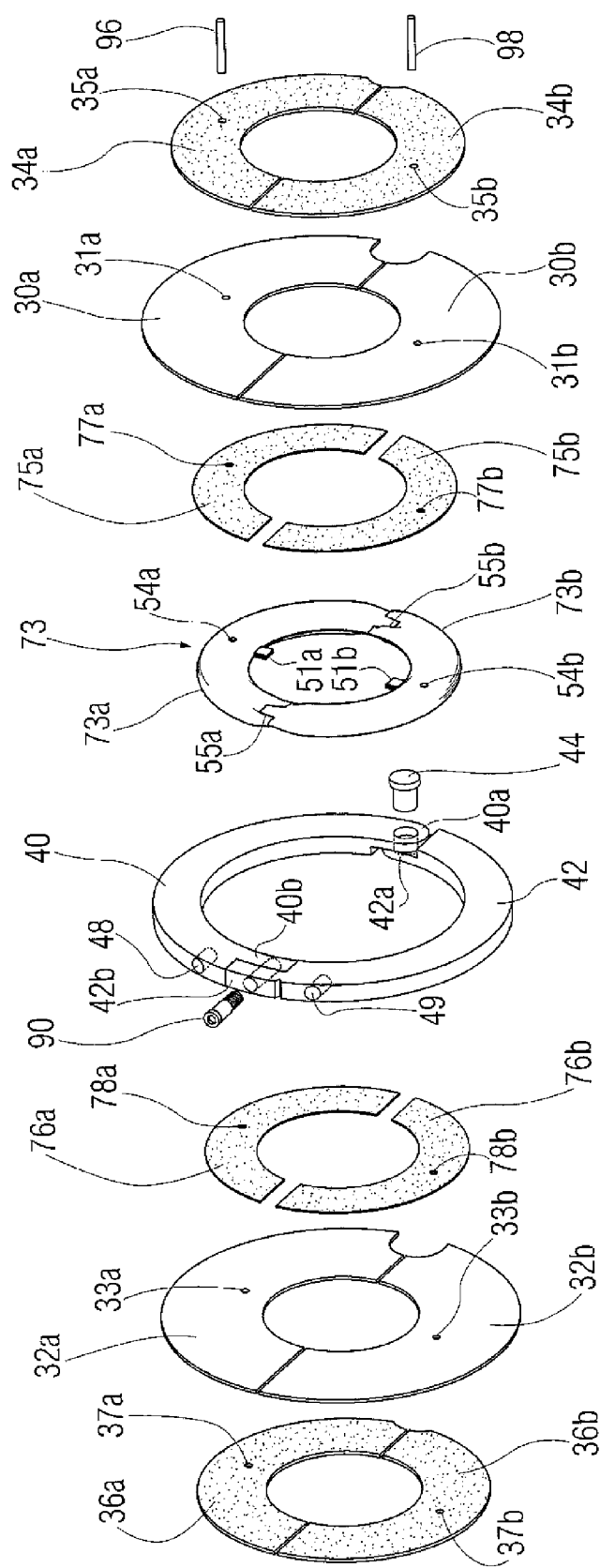
FIG. 3b is an exploded view of a second embodiment of a clutch brake assembly according to the present invention.
Figure 3C:
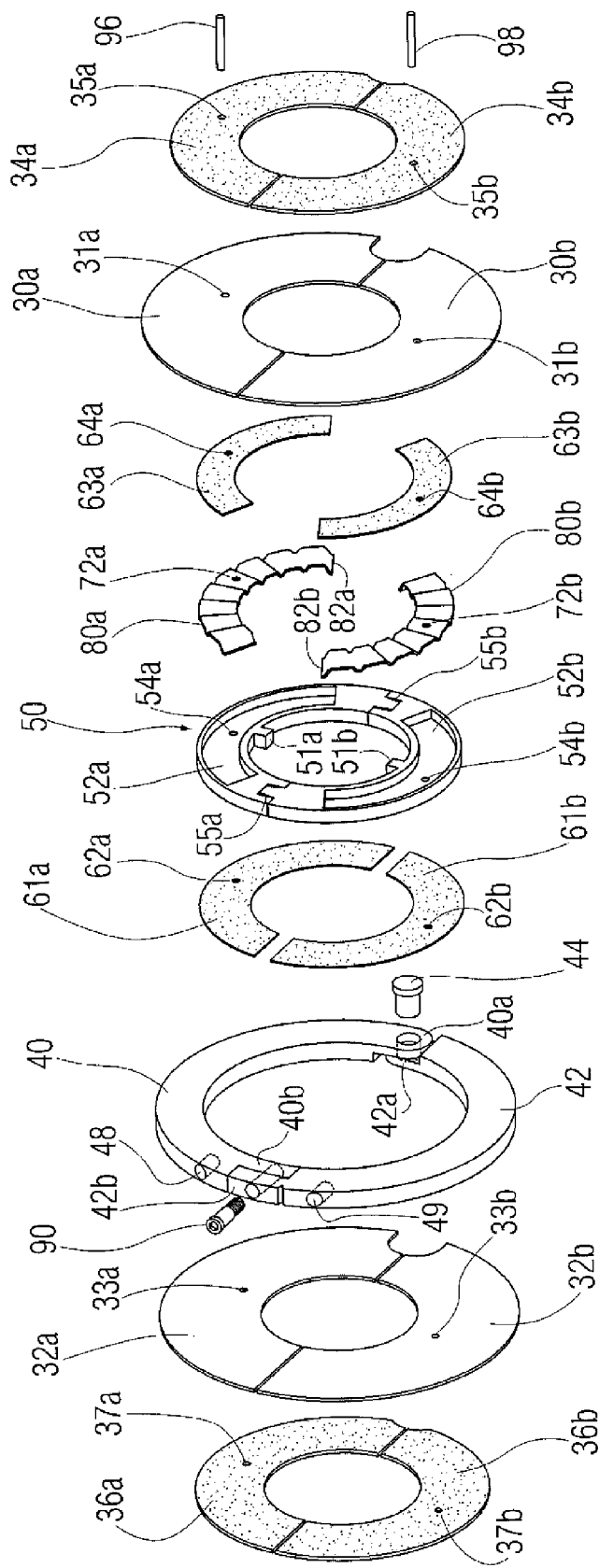
FIG. 3c is an exploded view of a third embodiment of a clutch brake assembly according to the present invention.

With reference to FIGS. 2 and 3a, the innermost component of the assembly is the inner collar 50 and includes two semicircular sections 50a, 50b, each of which has an inwardly projecting tang 51a, 51b. The tangs 51a, 51b form splines that cooperate with keyways 12a, 12b on the gearbox input shaft 12 (FIG. 2) so that rotation of the input shaft drivingly rotates inner collar 50. Both segments of the inner collar have the ends 55a, 55b shaped in such a way that will keep them engaged as long as they are within a closed cavity.

Each semicircular section 50a, 50b of inner collar 50 includes two pockets 52a, 52b which each have projections or mounting bosses 53a, 53b located towards the edges of the pocket. While two such bosses are shown for each pocket, more or fewer may be used without departing from the invention. Each pocket also includes a small through hole 54a, 54b shown located in the center of the pocket, the function of which will be described below.

Two pads 70a, 70b, are provided that are shaped to fit within the pockets 52a, 52b. As used herein, "pad" is intended to include structures that provide for frictional engagement between the inner collar and outer housing so as to resist relative rotation between the two. The surface of the pads have enhanced friction characteristics provided by, e.g., friction material 63a, 63b that may be formed thereon or bonded thereto. The pads 70a, 70b include holes 71a, 71b for locating the pads on the bosses 53a, 53b. In order to bias the pads into engagement with the outer housing, spring washers 80, such as "Belleville" washers, are mounted on the bosses between each inner collar and its respective pad.

Figure 4A:
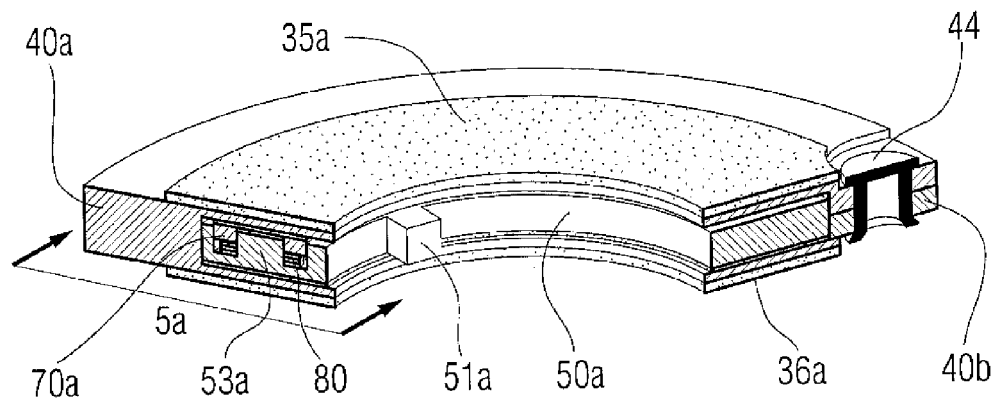
FIG. 4a is a perspective cross sectional view taken along line 4-4 of FIG. 2.

The housing for the inner collar 50 is provided by two arcuate members 40 and 42 having substantially flat, parallel front and rear faces and are coupled together by fastening means, namely rivet 44, at one end 40a and 42a of the arcuate members. This is the pivot point of the clutch brake. The front and rear faces are provided with outer plates 30a, 30b, 32a, 32b which are provided with friction enhancing surfaces 34a, 34b, 36a, 36b. As shown in FIG. 3a, the outer plates 30a, 30b, 32a, 32b may be formed separately from their respective arcuate members 40, 42. However, the outer plates and arcuate members could be formed integrally, as shown in FIG. 4a.

Figure 6:
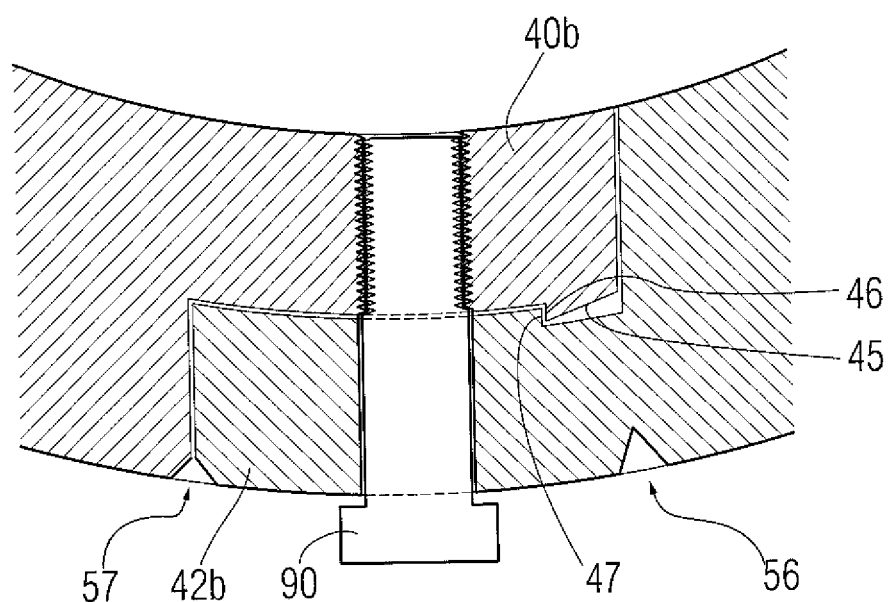
FIG. 6 is a detailed view of connecting ends of a clutch brake assembly according to the present invention.

In order to form a closed annular assembly 20 engaged with the tabs 51a and 51b on the input shaft 12, the second end 40b and 42b of the members 40 and 42 are preferably formed with complementarily-shaped mating projections, as shown in FIG. 6, to form a connection comprised of both the fastener 90 and a radial "snap-on".

The clutch brake components are assembled and compressed together within the outer housing covers 30a, 30b, 32a, 32b, the spring washers 80 are compressed and partially flattened out. The resiliency of the spring washers maintains a substantial pressure between the outer housing and the side of the inner collar 50 having the friction enhancing facings 61a, 61b and the friction-enhanced surfaces of the pads 70a, 70b, thus generating a frictional resistance to rotation of the inner collar 50 relative to the outer housing.

As best seen in FIG. 3a, each of the semi-annular subcomponents of the clutch brake 20 includes a small through hole, namely through holes 37a, 37b, 33a, 33b, 62a, 62b, 54a, 54b, 72a, 72b, 64a, 64b, 31a, 31b, 35a, 35b. These holes are for maintaining the alignment between components for assembly and mounting purposes. Specifically, the proper position of the collar 50 and its subcomponents relative to the outer housing and its subcomponents must be maintained during both manufacture and installation of the clutch brake. Accordingly, pins 96, 98 are received in the axially aligned holes. The pins thus prevent relative movement between the subcomponents of the collar and outer housing. However, upon the first engagement of the clutch brake, the pins 96, 98 are sheared off, thus allowing the inner collar to spin within the housing. The pins 96, 98 are preferably made of plastic, or other frangible material, so that they are relatively easily broken upon the use of the clutch brake 20.

The free ends 40b, 42b of the arcuate members 40 and 42 are preferably shaped as shown in FIG. 6. The ends 40b and 42b slide over each other due to the complementarily-shaped inclined surfaces or ramp 45, and lock in place when the straight surface 46 catches surface 47 of arcuate member 42. This is usually accompanied by an audible snap, thus signaling the installer that the assembly is fully closed and that the second feature can be activated by turning the fastener 90 which is threaded into the member 40 bringing and locking 40b and 42b together.

The installation of the clutch brake 20 is done through the inspection window of the transmission bell housing which is about 4 inches by 6 inches, providing limited access to the components in the bell housing.

To further facilitate the closing the clutch brake 20 about the shaft, two pins 92 and 94 are provided which are adapted to be removably received in two holes 48 and 49 located near the snap-on ends 40b and 42b. The pins are squeezed together until the snap is heard, and then removed from the holes 48 and 49. The fastener 90 may then be screwed in place to complete installation.

To remove the clutch brake 20, the fastener 90 is unscrewed and the tip of, e.g., a screwdriver is inserted between the two arcuate members 40 and 42 at the exposed outer connection 57 to pry open the clutch brake.

Alternatively, if fastener 90 cannot be removed for any reason, a V notch 56 is provided so that a chisel or similar tool may be used to break the outer housing connection between the two arcuate members 40 and 42. The clutch brake can then be pivoted open and easily removed.

Figure 4B:
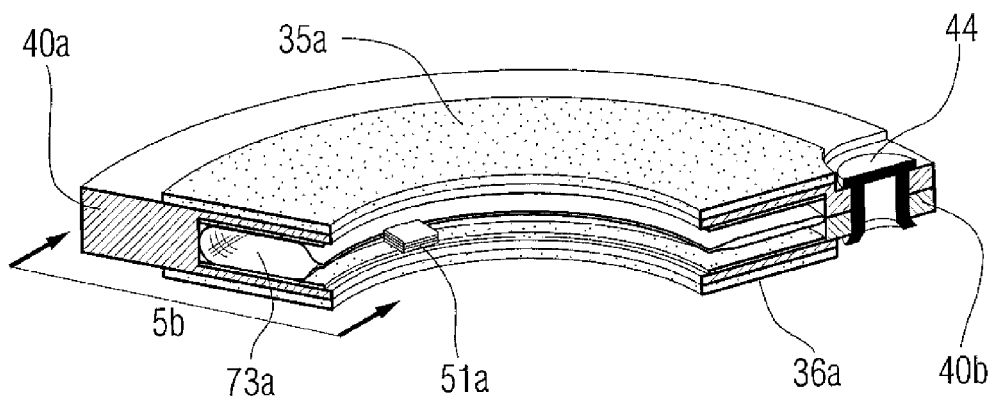
FIG. 4b is a perspective cross sectional view of the embodiment of FIG. 3b.
Figure 5A:
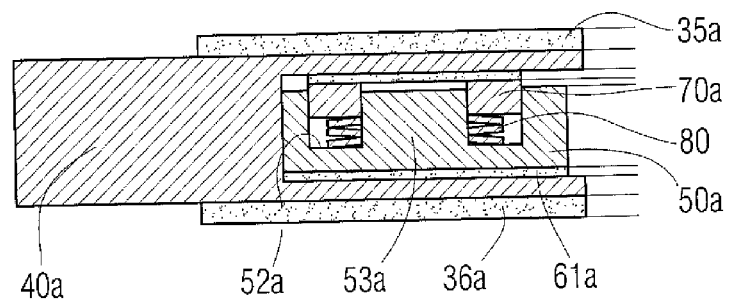
Figure 5B:
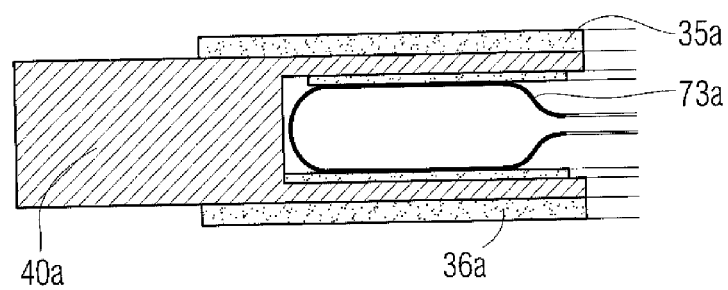
FIG. 5b is an enlarged cross sectional view taken along line 5b of FIG. 4b.

Turning to FIGS. 3b, 4b, and 5b, a first alternative embodiment of a torque-limiting clutch brake according to the present invention is shown. In this embodiment, components similar to those comprising the embodiment of FIGS. 2, 3a, 4a, and 5a, are numbered similarly.

In the first alternative embodiment, the inner ring comprises the pad. Specifically, the inner ring 73 comprises two similarly shaped semi-circular rings 73a, 73b that have a similar overall configuration to the inner ring 50. The inner ring 73 includes projecting tangs 51a, 51b for engaging keyways 12a, 12b on the shaft and complimentarily-shaped, interfitting ends 55a, 55b. Each of the semi-circular halves 73a, 73b of the inner ring 73 comprises a resilient material, such as spring steel, formed to have a generally-hollow interior (best seen in FIGS. 4b, 5b). The inner rings 73a, 73b form an expandable toroid that, when assembled into the outer housing, is compressed so as to apply an outward force on the opposed faces of the outer housing.

In this first alternative embodiment, rather than the outer faces of the inner ring having a friction-enhancing surface, the inner faces of the outer housing are provided with the friction-enhancing surface. As illustrated, the friction-enhancing surface 75a, 75b, 76a, 76b are formed separately and then bonded to the inner faces of the covers 30a, 30b, 32a, 32b. However, the friction-enhancing surface could be formed directly onto the surfaces of the sidewalls of the outer housing without departing from the invention. As illustrated, the friction facings 75a, 75b, 76a, 76b are provided with alignment through holes 77a, 77b, 78a, 78b, respectively, for receipt of pins 96, 98 to maintain alignment during assembly, as described above.

Figure 4C:
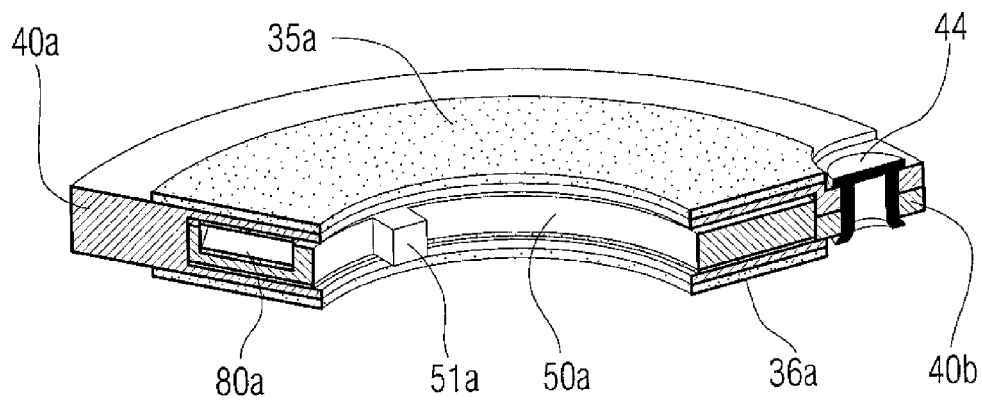
FIG. 4c is a perspective cross sectional view of the embodiment of FIG. 3c.
Figure 5C:
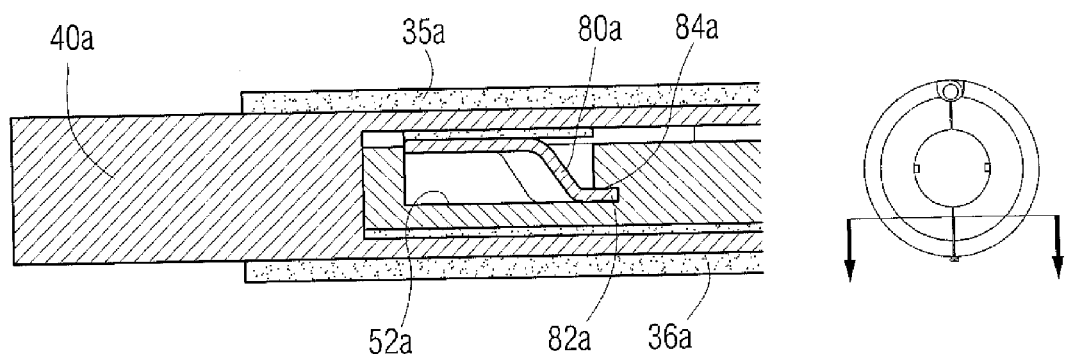
FIG. 5c is an enlarged cross sectional view taken along line 5c of FIG. 4c.

Turning to FIGS. 3c, 4c, and 5c, there is seen a second alternative embodiment that is similar to that shown in FIGS. 3a, 4a, and 5a, except that each pad 80a, 80b comprises a segmented leaf spring. Each leaf spring 80a, 80b comprises a plurality of generally U-shaped segments joined together end to end, with the outer surface having a friction-enhanced surface provided by the materials 63a, 63b. Alternatively, the pads 80a, 80b may comprise resilient wave washers.

As best seen in FIG. 5c, one end of the leaf spring has an extending tab 82 that is received in an undercut slot 84 in the recessed pockets 52a, 52b to help maintain the leaf spring in position for assembly.

Thus, a clutch brake assembly has been provided that meets all the objects of the invention. While the invention has been described in terms of certain preferred embodiments, there is no intent to limit it to the same. For example, while the pads providing frictional engagement between the housing and the inner collar are described as being carried by the inner collar, this could be reversed so that the pads are carried by the housing and are biased into frictional engagement with the inner collar. Thus, the invention is defined by the following claims.

The invention claimed is:

1. A clutch brake for mounting on a rotatable shaft comprising:

an outer annular housing comprising first and second arcuate members pivotably connected at a first end and releasably connectable at a second end, the second ends having complimentarily-shaped interlocking surfaces, and each arcuate member having opposed faces integral therewith defining a slot therebetween;

an inner annular collar adapted to be rotatably fixed to the rotatable shaft and capable of rotation relative to the outer housing, the inner collar comprising first and second arcuate members received within the slot in the outer housing;

each arcuate member of the inner annular collar having a recess that receives at least one pad, with each pad being biased axially into engagement with at least one of the opposed faces of the outer housing by at least one resilient member that is connected to the inner annular collar; and a fastener for securing the second ends of the first and second arcuate members of the outer housing to each other.

2. The clutch brake of claim 1 wherein one of the first and second arcuate members of the outer housing comprises a notch at an outer edge thereof, the notch predisposing the outer housing to breaking at the notch.

3. The clutch brake of claim 1 wherein the second ends of the arcuate members comprising the outer housing are complimentarily shaped so as to create an audible indication of when the second ends are brought into interlocking engagement.

4. The clutch brake of claim 1 wherein each resilient member further comprises at least one spring washer.

5. The clutch brake of claim 1 wherein each pad comprises a leaf spring that also forms one of the resilient members.

6. The clutch brake of claim 1 wherein the semi-annular members have aligned holes and frangible pins received in the aligned holes to maintain the relative position of the inner annular collar to the outer annular housing during assembly of the clutch brake and mounting to the rotatable shaft.

7. A clutch brake for mounting on a rotatable shaft comprising:
   an outer annular housing comprising first and second arcuate members pivotably connected at a first end and releasably connectable at a second end, the second ends having complimentarily-shaped interlocking surfaces, and each arcuate member having opposed faces integral therewith defining a slot therebetween;
   an inner annular collar adapted to be rotatably fixed to the rotatable shaft and capable of rotation relative to the outer housing, the inner collar comprising first and second arcuate members received within the slot in the outer housing;
   each arcuate member of the inner annular collar comprises a hollow expandable resilient member biased axially into engagement with at least one of the opposed faces of the outer housing; and
   a fastener for securing the second ends of the first and second arcuate members of the outer housing to each other.

8. The clutch brake of claim 7 wherein one of the first and second arcuate members of the outer housing comprises a notch at an outer edge thereof, the notch predisposing the outer housing to breaking at the notch.

9. The clutch brake of claim 7 wherein the second ends of the arcuate members comprising the outer housing are complimentarily shaped so as to create an audible indication of when the second ends are brought into interlocking engagement.

10. The clutch brake of claim 7 wherein the semi-annular members have aligned holes and frangible pins received in the aligned holes to maintain the relative position of the inner annular collar to the outer annular housing during assembly of the clutch brake and mounting to the rotatable shaft.

* * * * *